Figure 1:
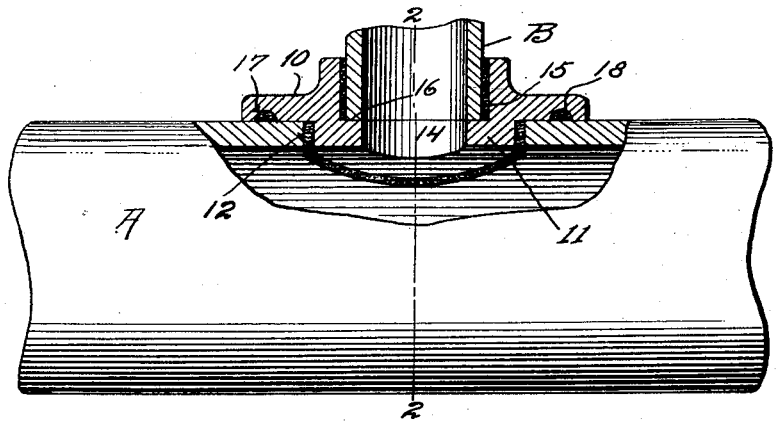

Oct. 18, 1932.      D. G. ADAMS      1,883,439

SEWER PIPE TAP

Filed March 6, 1930

Inventor
D. G. Adams
By
his Attorney

Patented Oct. 18, 1932

1,883,439

UNITED STATES PATENT OFFICE

DAVID G. ADAMS, OF SPARTANBURG, OF SOUTH CAROLINA

SEWER PIPE TAP

Application filed March 6, 1930. Serial No. 433,675.

The invention relates to connections and has special reference to means for tapping a waste line into a main sewer pipe.

It is well known that plumbing ordinances frequently require that if there is no Y-connection found in the main sewer where it is desired to connect a waste line from a house or the like that a Y-joint must be inserted. The work of applying a standard type of Y-joint is difficult and tedious and the result is that the requirement has been withdrawn in a great many cities, leaving it to the judgment of the plumber as to how the connection may be made. The usual plan is to tap a hole, insert the spigot end of a short section of pipe and continue with successive sections or lengths to build up the waste line. The great objection to this is that if the pipe happens to extend into the sewer pipe, that is project beyond the inner surface or periphery thereof, it causes an obstruction against which matter may subsequently accumulate and interfere with the proper flow through the sewer.

It is with the above facts in view that I have devised the present invention which has for its general object the provision of a novel device adapted to be tapped or connected into the sewer pipe and to receive the waste line.

An important object of the invention is to provide means of this character which while having a portion projecting into an opening in the sewer pipe is provided with means whereby it will be held in proper position thereon and prevented from displacement in any direction.

A more specific object of the invention is to provide a saddle member adapted to conformingly engage against the sewer pipe and formed with a portion entering an opening therein and additionally provided with a socket to receive the end of the waste pipe to be connected.

Still another object is to provide a saddle member of this type which may be formed in such manner as to facilitate positive securing and sealing in place so that any possible leakage of the joint will be avoided.

Still another object is to provide a connection of this character which though capable of being made of any desirable material is well adapted to be constructed of terra cotta or the like and to be secured in place simply by mortar or cement.

An additional object of the invention is to provide a device of this character which will be extremely simple and inexpensive to make, easy to apply or use, positive in action, efficient and durable in service, and a general improvement in the art.

Figure 2:
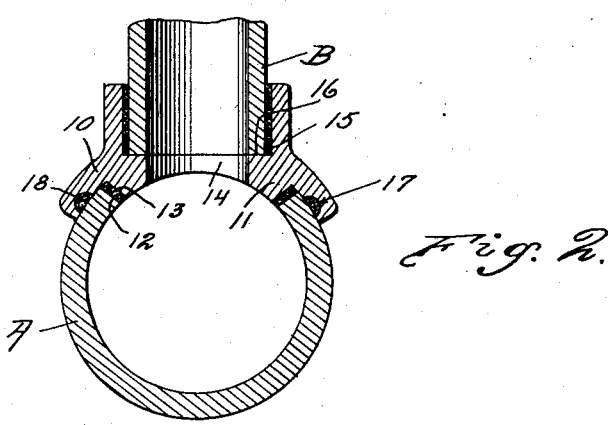
Figure 3:
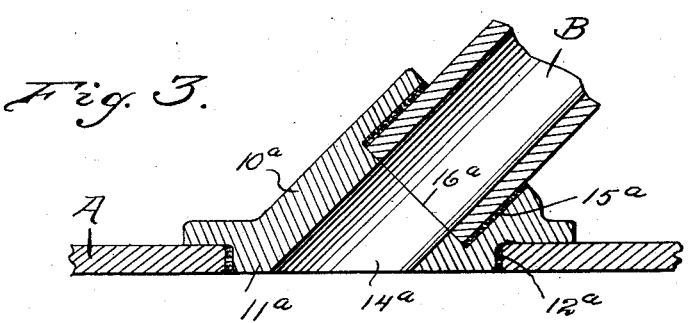

To the attainment of the foregoing and other objects and advantages, the invention preferably consists in the details of construction and the arrangement and combination of parts to be hereinafter more fully described and claimed, and illustrated in the accompanying drawing in which:

Figure 1 is a side elevation of a sewer pipe with parts broken away and in section to show my connection, Figure 2 is a cross sectional view taken on the line 2—2 of Figure 1, and Figure 3 is a sectional view similar to Figure 1 showing a modification wherein the waste line is to enter the sewer at an oblique angle.

Referring more particularly to the drawing the letter A designates a sewer pipe of any ordinary size or material to which it is desired to connect or into which it is wished to tap a waste pipe B. In carrying out the form of my invention shown in Figures 1 and 2, I provide a connecting device which may be described as a saddle member 10 which may conveniently be substantially rectangular in its general plan or of any other preferred shape and which is shown as a section of a cylinder, or in other words curved or arcuate in transverse section. It is intended that the curvature of this saddle member be such as to conform to that of the pipe A upon which it is to be used so that it may lie in close engagement therewith when applied. At its underside this saddle member is formed with a boss or projection 11 adapted to be received with a loose fit within a hole 12 which must be cut within the sewer pipe at the location where it is desired to connect the waste pipe B with it. It is preferable that the boss 11 and hole 12 be circular, or at least circular in plan. Furthermore, if desired, the periphery of the boss may be beveled at 13, at least with respect to the transverse dimension as shown in Figure 2 simply for the purpose of facilitating its insertion within the opening 12. The saddle member is formed with a circular hole 14 within the boss or extension 11 and with a counterbore, recess or socket 15 through the body portion, thus providing a shoulder 16 at their juncture.

In using the device, the hole 12 is first formed in the pipe A at the desired point and the saddle member is applied with the boss or projection 11 received within the opening 12. It is intended that this boss be of no greater thickness than the wall of the pipe so that it will not project beyond the inner surface to cause an obstruction. The pipe B is engaged within the socket or counterbore 15 and as it rests against the shoulder 16 it will be held in place and cannot project into the pipe. The parts are then easily secured together as by means of cement. Successive pipe sections are then assembled and continued from the section B to form the waste line, or any other equivalent method of construction may be followed.

If desired, the underside of the saddle member may be formed with a groove 17 spaced from its periphery for the reception of mortar or cement indicated at 18, this being an added refinement which might be omitted in some cases or if preferred, though it is of advantage on account of making a more perfect seal between the saddle member and the sewer pipe.

In the above described form of the invention it will be observed that the waste line enters the sewer pipe at right angles thereto. In many instances this may not be desirable and may actually be prohibited, the requirement being often that the waste line must enter obliquely. To take care of this situation I may resort to the modification shown in Figure 3 wherein the connection is so formed as to have the effect of a Y-joint. Referring to this figure in detail, it will be observed that the principle is the same, the saddle member 10$^a$ being provided at its underside with a projection 11$^a$ received within a hole 12$^a$ in the sewer pipe. The saddle member has the upstanding portion formed with a hole or bore 14$^a$ communicating with a recess, counterbore or socket 15$^a$, there being a shoulder 16$^a$ at the juncture thereof. The pipe section B is received and cemented or otherwise secured within the recess 15$^a$ in exactly the same manner as above described. In this form it will be observed that I omitted the grooves 17, simply for illustrative purposes and to bring out that these grooves are not essential.

From the foregoing description and a study of the drawing it will be apparent that I have thus provided a very simple and inexpensive connection which may be easily applied particularly as it is not necessary to have a close fit of the projection 11 or 11$^a$ within the hole 12$^a$ in the pipe. Such a hole may be easily formed in a cement, concrete or terra cotta pipe by chipping it away or by other means. It is apparent that the saddle member lends itself readily to formation from terra cotta or other plastic material. Of course the device may be made in any desired size depending upon the diameter of the sewer pipe and also that of the waste line to be tapped thereinto. It is believed that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. Means for connecting a waste pipe with a sewer pipe, comprising a preformed saddle member formed as a one piece casting of concrete and shaped as a section of a cylinder adapted to engage conformingly against a sewer pipe and provided at its concave side with a projection, the sewer pipe having an opening to receive the projection, a mass of cement surrounding the projection within the opening, and the saddle member being formed with a hole extending through the projection and further formed with a cylindrical counterbore concentric therewith defining a ledge and adapted to receive an end of a waste pipe abuttingly supported upon the ledge, and a mass of cement surrounding the waste pipe within the counterbore.

2. Means for connecting a waste pipe with a sewer pipe, comprising a preformed saddle member of concrete cast in one piece formed as a section of a cylinder adapted to engage conformingly against a sewer pipe and provided at its concave side with a projection, the sewer pipe having an opening to receive the projection, and the saddle member being formed with a hole extending through the projection and further formed with a counterbore concentric therewith defining a ledge and adapted to receive an end of a waste pipe abuttingly supported upon the ledge, the concave side of the saddle being formed with a groove located outwardly of the projection, and cement located within and filling said groove and sealing the saddle to the sewer pipe.

3. Means for connecting a waste pipe with a sewer pipe, comprising a saddle member formed of a single casting and as a section of a cylinder adapted to engage conformingly against a sewer pipe and provided at its concave side with a projection, the sewer pipe having an opening to receive the projection and adapted to accommodate a mass of cement surrounding the projection within the opening, and the saddle member being formed with a hole extending through the projection and further formed with a cylindrical counterbore concentric therewith defining a ledge for receiving an end of a waste pipe abuttingly supported upon the ledge, said counterbore being adapted to accommodate a mass of cement surrounding the waste pipe within its confines.

4. Means for connecting a waste pipe with a sewer pipe, comprising a saddle member formed of a single casting and as a section of a unit adapted to engage conformingly against a sewer pipe and provided at its concave side with a projection, the sewer pipe having an opening to receive the projection and to accommodate a mass of cement embedding the projection, and the saddle member being formed with a hole extending through the projection and further formed with a counterbore concentric therewith defining a ledge and adapted to receive an end of a waste pipe abuttingly supported upon the ledge, the concave side of the saddle being formed with a groove located outwardly of the projection, said groove being adapted to accommodate a cement filling for sealing the saddle to the sewer pipe.

In testimony whereof I affix my signature.

DAVID GREGG ADAMS.